United States Patent [19]
Cave et al.

[11] Patent Number: 5,570,419
[45] Date of Patent: Oct. 29, 1996

[54] SYSTEM AND METHOD FOR AN IMPROVED PREDICTIVE DIALER

[75] Inventors: Ellis K. Cave, Garland; Larry P. Ammann, Richardson; Christopher P. Zimmer, Plano, all of Tex.

[73] Assignee: InterVoice Limited Partnership, Reno, Nev.

[21] Appl. No.: 543,010

[22] Filed: Oct. 13, 1995

[51] Int. Cl.⁶ .......................... H04M 3/42; H04M 15/00; H04M 3/00

[52] U.S. Cl. .................. 379/216; 379/113; 379/266; 379/309

[58] Field of Search ................................. 379/113, 133, 379/134, 265, 266, 309, 216

[56] References Cited

U.S. PATENT DOCUMENTS

| | | | |
|---|---|---|---|
| 4,599,493 | 7/1986 | Cave | 379/247 |
| 4,797,911 | 1/1989 | Szlam et al. | 379/67 |
| 4,829,563 | 5/1989 | Crockett et al. | 379/309 |
| 5,155,763 | 10/1992 | Bigus et al. | 379/309 X |
| 5,247,569 | 9/1993 | Cave | 379/113 |
| 5,327,490 | 7/1994 | Cave | 379/216 |

*Primary Examiner*—Krista M. Zele
*Assistant Examiner*—Harry S. Hong
*Attorney, Agent, or Firm*—Fulbright & Jaworski L.L.P.

[57] ABSTRACT

There is disclosed a system and method for controlling the call placement rates of a predictive dialer telephone system in which outbound calls are automatically placed in anticipation of telephone agents becoming available. The system allows a system supervisor to specify target values of agent utilization, customer hold time, and drop rate for the system. The system then paces outbound telephone calls to maintain the specified parameter as close as possible to the target value specified by the system supervisor.

14 Claims, 2 Drawing Sheets

SYSTEM AND METHOD FOR AN IMPROVED PREDICTIVE DIALER

TECHNICAL FIELD OF THE INVENTION

This invention relates to multi-line automatic calling telephone systems and in particular to an improved predictive dialing system.

BACKGROUND OF THE INVENTION

There are numerous systems disclosed in the prior art, such as U.S. Pat. Nos. 4,599,493 and 4,797,911, for automatically dialing telephone numbers and connecting an agent, usually from a pool of agents, to the call when the called party answers. These systems, known as predictive dialers, are designed to minimize the amount of time an agent spends dialing telephone numbers and waiting for answers and thereby maximize the amount of time the agent spends talking with the called party and transacting business. Some predictive dialers are relatively simple systems that do little more than dial a number and connect an agent to the call when the call is answered.

More advanced predictive dialers, such as U.S. Pat. No. 5,327,490 employ call-pacing algorithms that use call session statistics gathered by the telephone system to predict when a telephone call will end and, in anticipation of the agent hanging up, initiate a new telephone call. The teachings of U.S. Pat. No. 5,327,490 are hereby incorporated by reference into the present disclosure. In the ideal situation, the new outgoing telephone call will be answered just as a previous telephone call terminates, thereby eliminating idle time for the telephone agents.

The prior art telephone predictive dialing systems, however, were limited in that a supervisor of a pool of telephone agents was unable to set a desired target value for any of the operating parameters of the predictive dialing systems. In the prior art systems, such as U.S. Pat. No. 5,327,490, the supervisor could exercise throttle-like control to speed up or slow down the rate at which the predictive dialer placed outbound calls. If the supervisor noted that an unacceptably high percentage of the telephone agents were idle, the supervisor had the ability to increase the rate at which outbound calls were placed. Conversely, if all of the agents were constantly busy and customers were being placed on hold for long periods by the predictive dialer system, the supervisor could decrease the rate at which outbound calls were placed by increasing the length of the Call Pacing Delay. However, in the prior art systems, the supervisor was limited to making relative adjustments to the Call Pacing Delay (i.e., faster or slower) but could not establish an absolute value (or goal) for any of the call parameters.

Accordingly, a need exists in the art for a goal-based automated pacing system which allows a supervisor to set a target value for a particular telephone call parameter, such as agent utilization, drop rate, or hold time.

A further need exists in the art for such a system which will hold the selected telephone call parameter relatively constant while the independent variables of the system, such as the number of operators, the answer rate and agent call time, fluctuate.

SUMMARY OF THE INVENTION

These and other problems inherent in the prior art have been solved by providing a goal-based automatic call placement system which allows a supervisor to establish a target value for a specified telephone call parameter and which adjusts the length of the Call Pacing Delay in order to reach the target value.

In one embodiment of the present invention, a statistical engine measures actual hold time and calculates the average hold time of telephone calls being handled by a plurality of agents. Processing circuitry adjusts the length of the Call Pacing Delay to thereby force the average hold time of each telephone call to a target value established by the supervisor.

In another embodiment of the present invention, a statistical engine measures agent in-use times and idle times and calculates average agent utilization (i.e., busy time expressed as a percent of total time) of a plurality of agents. Processing circuitry adjusts the length of the Call Pacing Delay to thereby force the agent utilization to a target value established by the supervisor.

In a further embodiment of the present invention, a statistical engine monitors and updates the overall drop rate of telephone calls being handled by a plurality of agents. Drop rate is expressed as a percent of live answered calls. Processing circuitry adjusts the length of the Call Pacing Delay to thereby force the overall drop rate of telephone calls to a target value established by the supervisor.

The foregoing has outlined rather broadly the features and technical advantages of the present invention in order that the detailed description of the automatic call placement system that follows may be better understood. Additional features and advantages of the automatic call placement system will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
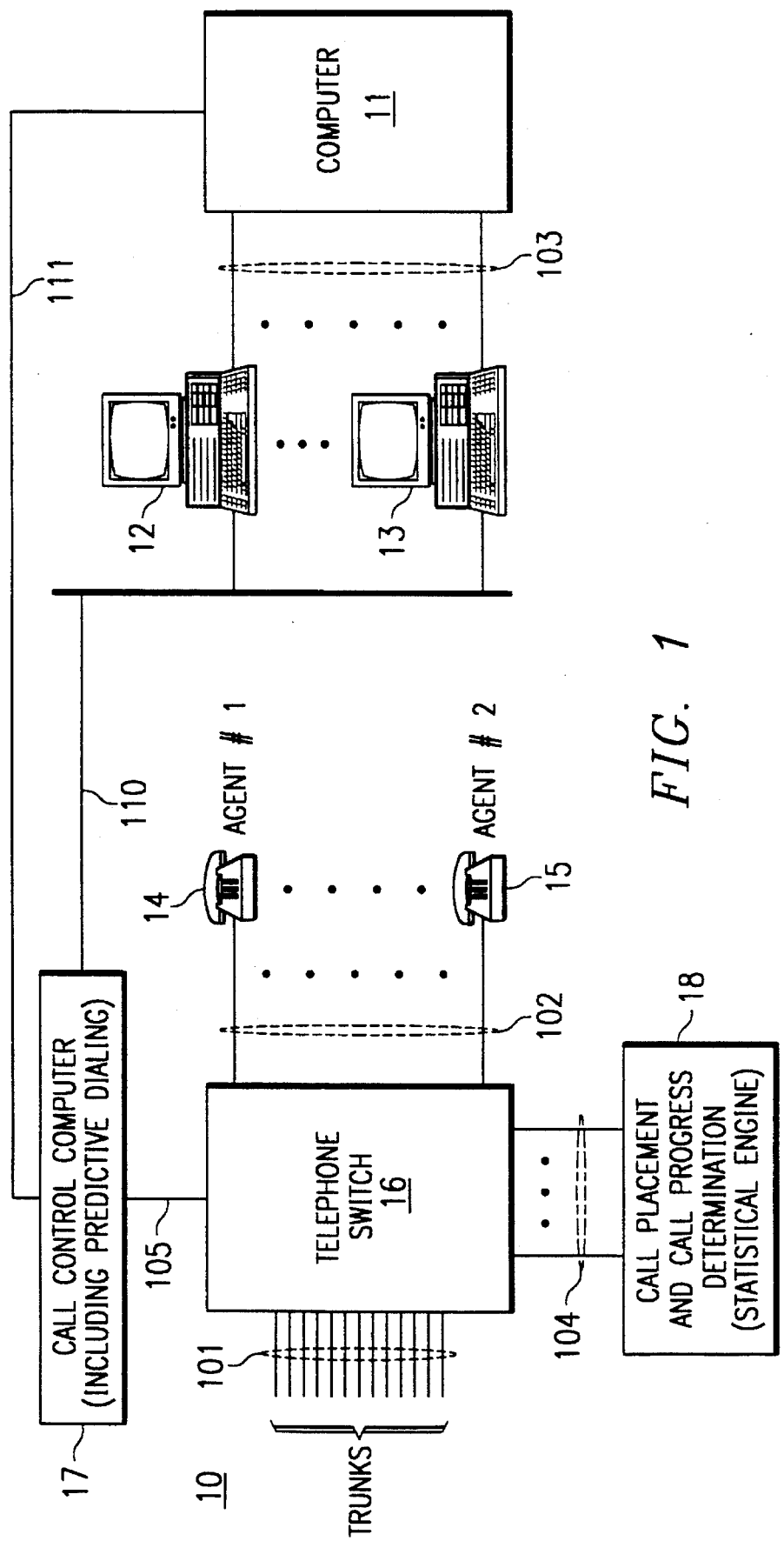
FIG. 1 depicts a multi-line, multi-agent telephone system employing a predictive dialer in accordance with the present invention.

The principles of the present invention and their advantages are best understood by referring to the illustrated embodiments depicted in FIG. 1.

FIG. 1 shows telephone system 10 coupled to a telephone exchange (not shown) through telephone trunk lines 101. Telephone switch 16 connects a pool of telephone agents, including Agent 1 and Agent 2, to telephone trunk lines 101. Agent 1 and Agent 2 utilize computer input terminal 12 and telephone 14, and computer input terminal 13 and telephone 15, respectively.

The computer input terminals used by the agent pool are coupled by bus 103 to central computer 11, typically, a main frame. Computer 11 is used to store and retrieve data needed by or gathered by the agents during customer calls. Computer 11 also communicates over bus 111 with call control computer 17. Call control computer 17 places outbound calls through telephone switch 16 by initiating and monitoring each call through statistical engine 18. Statistical engine 18 monitors telephone calls from telephone switch 16 using lines 104. From the moment the telephone call is initiated through telephone switch 16 until the telephone call is ended by either a no-answer situation, a busy signal being received, the recognition of an answering or fax machine, or the customer or agent hanging up, statistical engine 18 measures numerous telephone call parameters and calculates the pertinent telephone call statistics.

Telephone system 10 also receives inbound calls on telephone trunk lines 101 and adjusts the pace of outbound calls through call control computer 17 accordingly. In a preferred embodiment, telephone system 10 contains circuitry for receiving and recognizing customer ANI data sent by the public telephone system along with each call. In this way, telephone system 10 can identify each incoming caller, retrieve their data records and send the data to a computer input terminal before telephone system 10 even answers the incoming call.

If and when an outbound telephone call is answered, statistical engine 18 notifies call control computer 17, which then causes telephone switch 16 to connect the appropriate telephone trunk line 101 to an available agent over a selected line 102. Call control computer 17 also transmits pertinent customer telephone information across bus 110 to the computer terminal associated with the agent handling the call. The computer terminal then relays the customer telephone information over bus 103 to computer 11 which accesses its database to provide customer account information to the agent handling the call.

In a real world telephone environment, many of the outbound telephone calls initiated by call control computer 17 through telephone switch 16 will not be answered. Some of the outbound telephone calls will receive busy signals; some will be connected to an answering machine; and, others will continually ring for an extended period without being answered by either a person or an answering machine. If the number of outbound telephone calls being placed by call control computer 17 match the number of agents 1 to 1, these "no-answer" situations would result in an unacceptably high level of agent idle time.

To avoid this situation, the number of outbound calls being placed on telephone trunk lines 101 usually exceeds the number of agents in the agent pool. The primary function of call control computer 17 is to place enough outbound calls on telephone trunk lines 101 so that the number of calls that are actually answered by a customer is equal to the number of agents in the agent pool. Ideally, as a telephone conversation between an agent and a customer is ended, a new outbound call will successfully connect to a customer and immediately be connected to the now available agent, thereby eliminating idle time. Furthermore, in the ideal situation, no customer would ever be placed on hold by telephone switch 16 while telephone system 10 waited for an agent to become available.

Generally, the goals of maximum agent utilization and zero hold-time for customers are mutually exclusive. That is, if a supervisor wishes to keep the telephone agents busy a very high percentage of the time, the supervisor may do so by decreasing the length of the Call Pacing Delay used by call control computer 17. However, this will almost inevitably result in many customers being placed on hold for an unacceptably long period of time. As a result, many customers will hang up and telephone system 10 will exhibit a very high "drop rate".

Conversely, if the supervisor forces Call Pacing Delay to a longer value, such that call control computer 17 spaces outgoing telephone calls further apart, the "drop rate" will decrease because less customers are on hold. However, the telephone agents will likely spend more time idle while waiting for the next outbound call to be connected.

The present invention allows a supervisor of telephone system 10 to choose from the competing considerations of agent utilization and the related statistics, hold-time and drop rate. For example, the system supervisor may specify that call control computer 17 initiate outbound telephone calls such that agent utilization is 85% (i.e. agents are idle only 15% of the time). Alternatively, the system supervisor may specify that customer hold time be a specified average time period, such as 10 seconds. In another alternative, the system supervisor may specify that the overall average drop rate of telephone system 10 be a certain target percentage. The drop rate reflects the number of live answered telephone calls that are dropped by either the customer or the system before the customer is connected to a telephone agent. In this way, the system supervisor may specify a target drop rate regardless of the corresponding value of hold-time. Generally, however, drop rate and hold-time will be related in that drop rate will increase as the average customer hold-time increases.

In all of the foregoing situations, the present invention will adjust the value of the Call Pacing Delay in order to reach the target value of either agent utilization, drop rate, or hold-time specified by the system supervisor. System supervisors typically have a computer input terminal connected to computer 11 that enables the system supervisor to enter target values using traditional keyboard/mouse devices. In prior art devices, a system supervisor typically increased or decreased the Call Pacing Delay using a "slide bar" graphic interface on a computer terminal. This made relative changes (i.e., faster or slower) to the rate of outbound calls in a throttle-like manner. The supervisor could thereby increase or decrease agent utilization relative to a previous level of agent utilization, although no target value could be established. The present invention allows the system supervisor to select specific numerical values for agent utilization, drop rate or hold time.

After the system supervisor enters a target value for the desired parameter, call control computer 17 adjusts the Call Pacing Delay to keep the specified parameter at or near the target value despite changes in the number of inbound and outbound calls being handled by telephone switch 16 and despite sudden fluctuations in the number of calls being answered by customers.

For example, during the early afternoon when most customers are at work, a telephone campaign to customers' homes will achieve a relatively low success rate of answered telephone calls. In such a case, perhaps only 30% of the outbound calls placed by the present invention may be answered by customers. However, at about 6 p.m., the number of customers at home will dramatically increase. This may cause the answer rate of outbound telephone calls to suddenly increase to 60%. If the system supervisor had set the target value for average customer hold time to be 15 seconds when the answer rate was 30%, the Call Pacing Delay used to maintain a 15-second average hold time will be much too short when the answer rate of outbound telephone calls suddenly leaps to 60% and an increasing number of people are placed on hold. In such a case, the present invention increases the value of Call Pacing Delay in order to maintain the target value of customer hold time.

Figure 2:
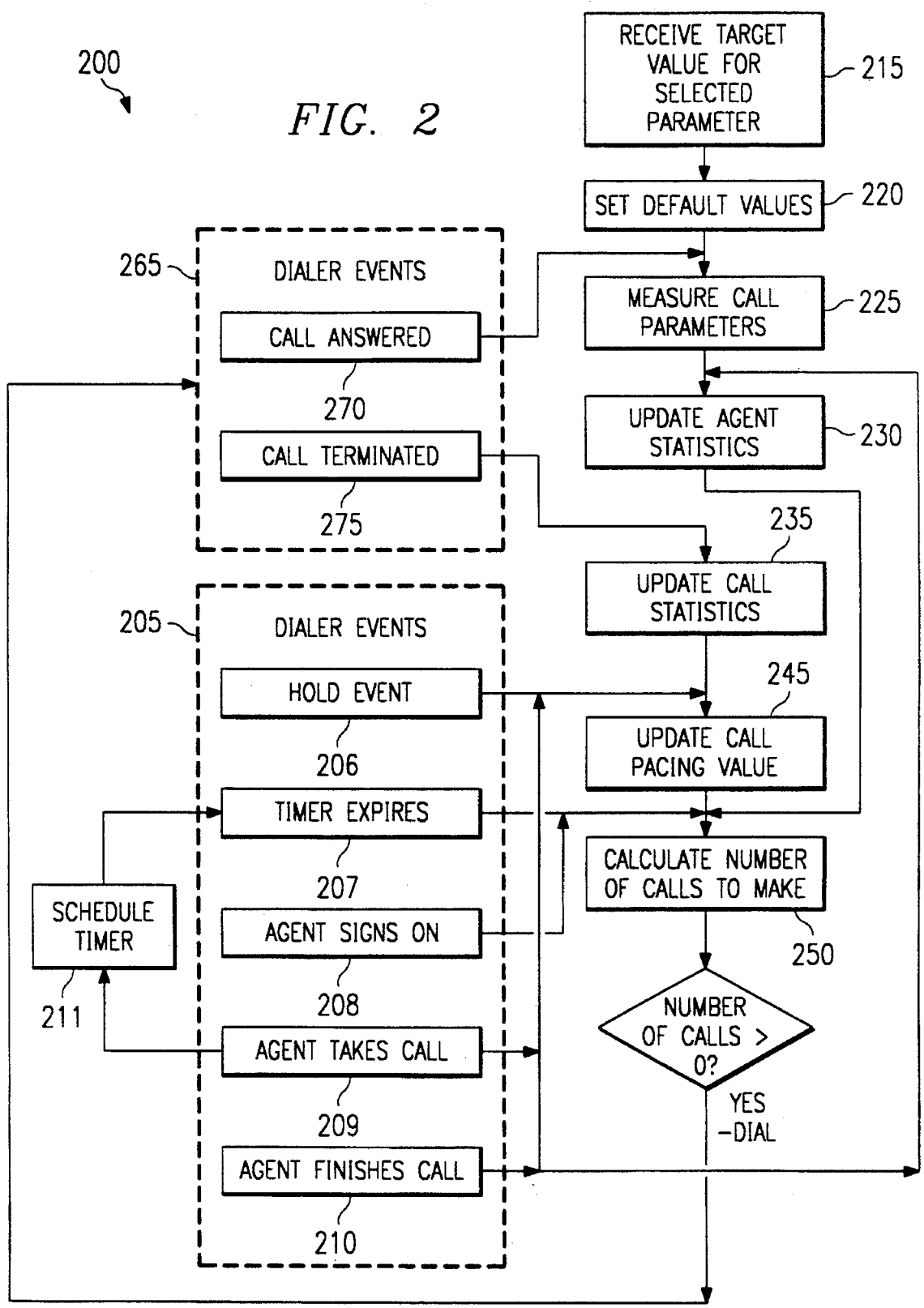
FIG. 2 depicts a logical flow diagram of the present invention.

FIG. 2 depicts a logical flow 200 of the system in accordance with the present invention. Statistical engine 18 (FIG. 1) monitors particular dialer events (Items 205 and 265) which trigger an action by statistical engine 18. Initially, call control computer 17 (FIG. 1) receives a target value for a system parameter from the system supervisor and sets the internal registers of statistical engine 18 and call computer 17 to particular default values, as outlined below (Items 215 and 220 in FIG. 2). Call statistics only need to be updated at a Call Terminated Event 275 which causes statistical engine 18 to measure specific parameters of an individual phone call (Item 225) and to update the call statistics (Item 235) for the telephone system 10. Likewise, agent statistics are only updatd at Agent Takes Call Event 209 and at an Agent Finishes Call Event 210. Depending on the event, different parameters/input are updated at this time. These include factors such as busy times and idle times, some of which are set out below:

| EVENT | ACTION |
|---|---|
| Call Answered Event | update agent statistics |
| | calculate number of calls to make |
| Agent Takes Call | update estimate (agent utilization mean hold time, or drop rate) if necessary: |
| | adjust pacing delay |
| | calculate number of calls to make |
| | schedule timer |
| Hold Event | update mean hold time estimate |
| | adjust pacing delay if required |
| | calculate number of calls to make |
| | schedule timer if necessary |
| Timer Expires | calculate number of calls to make |
| Agent Finishes Call | update agent statistics |
| | update agent utilization estimate |
| | adjust pacing delay if necessary |
| | calculate number of calls to make |
| Call Terminated | update call statistics |
| | update drop rate estimate if necessary |
| | calculate number of calls to make |
| New Agent Signs On | calculate number of calls to make |

After statistical engine 18 has measured call parameters, updated agent statistics and updated call statistics (Items 225, 230 and 235), call control computer 17 compares the target value for a selected parameter entered by the system supervisor with an estimated agent utilization rate, mean hold time, or estimated drop rate, depending on type of pacing being used. Based on the calculated difference between the target value and the estimate, call control computer 17 updates the Call Pacing Delay with an incremented or decremented value in order to reduce the calculated difference (Item 245). Under the guidance of the new Call Pacing Delay, call control computer 17 initiates the next outbound call (Item 250).

The basic tool used by the present invention to control the Call Pacing Delay is an exponentially weighted average of a selected statistic. For example, in a preferred embodiment of the present invention, a supervisor may select an exponentially weighted average of drop rate to adjust the Call Pacing Delay. The advantage of using an exponentially weighted average rather than a fixed-width moving average is that the exponentially weighted average gives the highest weight to the most recent observation and gives progressively smaller weights to past observations. The exponential weighing parameter can be adjusted to position the resulting average between the competing considerations of high precision and quick response to environmental change.

At this point, a general discussion of the method of updating the statistics monitored by the present invention is helpful. Suppose that $X_k$, $k \geq 1$, represents independent observations with an average value (or mean), $E(X_k)=\mu_k$ and a variance, $Var(X_k)=\sigma_k^2$, $k \geq 1$. The exponentially weighted average based on $X_1, \ldots, X_n$ is defined by:

$$\mu_n = \frac{\sum_{k=1}^{n} \delta^{n-k} X_k}{\sum_{k=1}^{n} \delta^{n-k}} = \frac{N_n}{D_n} \left[ \frac{\text{(numerator}(n)\text{ of }est)}{\text{(denominator}(n)\text{ of }est)} \right]$$

where $\delta$ is the exponential weighing factor which satisfies $0<\delta<1$. (Typically, $\delta$ is $0.9 <\delta<1$.)

Now suppose that a new observation, $X_{n+1}$, is available. Then the estimate $\mu^*_n$ is updated by $$\mu_{n+1}^* = \frac{N_{n+1}}{D_{n+1}}, \, N_{n+1} = \delta N_n + X_{n+1}, \, D_{n+1} = \delta D_n + 1.$$

If the stochastic (random) environment is stable, that is $\mu_k$ maintains a constant value $\mu$, then $\mu^*_n$ will stay close to $\mu$. However, if $\mu_k$ is varying over time, then $\mu^*_n$ will track this changing value fairly closely. How closely depends on how fast $\mu_k$ varies and on the value of the exponential weighing factor $\delta$. Smaller values of $\delta$ down-weight older observations more quickly, thereby allowing a quicker response to rapid changes in $\mu_k$. On the other hand, if $\mu_k$ is changing relatively slowly, then smaller values of $\delta$ will give less precise estimates of $\mu_k$.

To assist in calibrating $\delta$, it is helpful to compare the variance of a fixed sample size average with the exponentially weighted average in a constant environment. For sample size n, the variance of the sample mean $\overline{X}$ is $\sigma^2/n$. The variance of the exponentially weighted average based on m observations, $\mu^*_m$, is given by $$Var(\mu_m^*) = Var\left(\frac{\sum_{k=0}^{m-1} (\delta^k X_{m-k})}{\sum_{k=0}^{m-1} \delta^k}\right)$$

$$= \left(\frac{1-\delta}{1-\delta^m}\right)^2 \sum_{k=0}^{m-1} \delta^{2k}\sigma^2 = \sigma^2 \frac{(1-\delta)(1+\delta^m)}{(1+\delta)(1-\delta^m)}$$

If m is large, this variance is approximately $\sigma^2(1-\delta)/(1+\delta)$. Equating the variances for these two estimators and expressing the fixed sample size in terms of $\delta$ gives $n=(1+\delta)/(1-\delta)$. Hence, $\delta=0.95$ corresponds to a fixed sample size of 39 and $\delta=0.975$ corresponds to a fixed sample size of 79.

CONTROLLING DROP RATE

The drop rate is the rate at which customers called by the present invention hang up, or are disconnected by the present invention, without being connected to an agent. Customer will usually do this because they do not like being on hold for more than a brief period. The system will also drop a customer if they have been on hold too long. If customers are dropping calls or being dropped at a high rate, that is an indication that the average hold time is too long. On the other hand, if no customers are hanging up, that may be an indication that an insufficient number of outbound calls are being placed, resulting in an average hold time that is too low, or even zero. It is therefore desirable that a supervisor be able to set a target level on the drop rate to thereby prevent an unacceptably high number of customers from becoming upset about being called by the present invention and then placed on hold, while still maintaining a relatively high number of outbound calls.

In one embodiment of the present invention, an exponentially weighted estimate of drop rate is used to control the Call Pacing Delay so that the drop rate remains close to a target value. To accomplish this, the Call Pacing Delay is adjusted up or down according to the distance between the estimated drop rate and the target drop rate. If the current estimate of drop rate is far from the target, then the Call Pacing Delay receives a large adjustment. But, if the estimated drop rate is close to the target, then only a small adjustment is needed.

The problem, then, is to give a meaningful definition to distance between the estimated and target drop rates. Because of the stochastic nature of the call answer rate, time-to-answer rate, customer hold time and agent talk time, the estimated drop rate will exhibit variability even if the overall drop rate is constant. For this reason, a preferred embodiment of the present invention defines the distance between the estimated and target drop rates in terms of the standard deviation of the estimated drop rate, computed under the assumption that the population drop rate is at the target value. This standard deviation represents the "natural variability" of the estimate when the drop rate is on target.

The estimated drop rate is updated at the occurrence of either of two events: 1) an Agent Takes Call, or 2) a Call Terminated. Customer-initiated drops and system-initiated drops both contribute to drop rate. Let $X_k=1$ if the $k^{th}$ answered call is dropped and let $X_k=0$ if the $k^{th}$ answered call is connected to an agent. Let $P^*_n$ and $P_0$ denote the estimated drop rate and the target drop rate, respectively, expressed as percentages. If the $(n+1)^{th}$ answered call is dropped, then the drop rate estimate is updated by:

$$P_{n+1}^* = 100\left(\frac{N_{n+1}}{D_{n+1}}\right), N_{n+1} = \delta N_n + 1, D_{n+1} = \delta D_n + 1,$$

where N is the numerator of the drop rate estimate and D is the denominator of the drop rate estimate.

If the $(n+1)^{th}$ answered call is connected to an agent, then $$P_{n+1}^* = 100\left(\frac{N_{n+1}}{D_{n+1}}\right), N_{n+1} = \delta N_n, D_{n+1} = \delta D_n + 1.$$

Now assume that the overall drop rate is at the target. This implies that $P(X_k=1)=P_0/100$. The estimated drop rate will vary about the target since it is a finite-sample estimate of the overall drop rate percentage. The expected value of the estimate is $E(P^*_n)=P_0$ and the variance is $$\sigma_n^2 = Var(P_n^*) = \frac{P_0(100-P_0)}{D_n^2} \sum_{K=1}^{n} \delta^{2(n-k)}.$$

This variance can be updated when a new observation arrives by where $$\sigma_{n+1}^2 = P_0(100-P_0)\frac{M_{n+1}}{D_{n+1}^2}, M_{n+1} = \delta^2 M_n + 1,$$

$$M_n = \sum_{k=1}^{n} \delta^{2(n-k)},$$

where N is the numerator of drop rate estimate; D is the denominator of drop rate variance; $P_o$ is the target drop rate; $P_n$ is the current drop rate estimate; and, M is the numerator of drop rate variance.

The standard deviation $\sigma_n$ can be used to scale the difference between the estimated and target drop rates, $A_n=(P^*_n-P_0)/\sigma_n$. The Call Pacing Delay is then adjusted by an amount that is proportional to this distance, $L_{n+1}=L_n+cA_{n+1}$, where $L_n$ is the current value of the Call Pacing Delay.

Note that if the estimated drop rate, $P^*_n$, is greater than the target drop rate, $P_0$, then $A_{n+1}>0$. This has the effect of slowing down the calling rate (i.e., increases the Call Pacing Delay). If the estimated drop rate is less than the target drop rate, then $A_{n+1}<0$. This has the effect of increasing the calling rate (i.e., decreases the Call Pacing Delay). The proportionality constant c is initially taken to be 1, but that value may need to be adjusted if it results in over- or under-control of the Call Pacing Delay.

CONTROLLING AGENT UTILIZATION

Agent utilization is the average percentage of time that agents are handling a call, whether an inbound or an outbound call. If agent utilization is at or near 100%, that is an indication that many customers are being placed on hold and that there is no excess capacity to handle inbound calls or any sudden increase in the rate at which outbound calls are answered. If agent utilization is at 50%, however, that is an indication that an insufficient number of outbound calls are being placed. The present invention allows a system supervisor to set a target value for average agent utilization and increase or decrease the Call Pacing Delay to maintain the average as close as possible to the target value.

The basic concepts employed in the previous section to control drop rate can also be used to control agent utilization. However, the development of an exponentially weighted estimate of agent utilization and its properties is a more complex process than estimation of a proportion since an estimate of agent utilization must be updated at the end of each agent busy time and agent idle time.

Let $X_k$, $Y_k$, $k \geq 1$, be independent random variables that have means, $E(X_k)=\mu_x$, $E(Y_k)=\mu_y$, and variances $Var(X_k)=\delta_x^2$, $Var(Y_k)=\delta_y^2$. Here $X_k$ represents agent talk times and $Y_k$ represents agent idle times. Also, let $I_k$, $k \geq 1$, denote independent Bernoulli random variables with $P(I_k=1)=p$, $0<p<1$. The event $(I_k=1)$ indicates that the $k^{th}$ time sent to the statistical engine is an agent talk time, and the event $(I_k=0)$ indicates that the $k^{th}$ time is an agent idle time. The exponentially weighted estimate of agent utilization is then $$U_n = \frac{S_n}{S_n + T_n}$$

where $$S_n = \frac{\sum_{k=1}^{n} \delta^{n-k} I_k X_k}{D_n}, T_n = \frac{\sum_{k=1}^{n} \delta^{n-k}(1-I_k)Y_k}{D_n},$$

and $$D_n = \sum_{k=1}^{n} \delta^{n-k},$$

where $S_n$ and $T_n$ are the intermediate results used to calculate agent utilization estimate.

The statistical properties of this estimate cannot be obtained explicitly in full generality because both the numerator and denominator of $U_n$ are random variables. However, the present invention uses a Taylor's series approximation to obtain approximate expressions for the mean and variance of $U_n$, and these, in turn, are used to derive a distance function for the difference between estimated agent utilization and target utilization.

The statistical parameters of agent busy time and agent idle time are updated at the occurrence of either of two events: 1) Agent Takes Call, in which case the time sent to the statistical engine is an idle time, and 2) Agent Finishes Call, in which case the time sent to the statistical engine is an agent busy time.

The exponentially weighted parameters that are accumulated and updated to compute the required statistics are listed below. Because of their interdependence, they should be updated in the order given.

1. agent utilization;
2. busy period proportion;
3. means of agent idle time and agent busy time; and
4. variance of agent idle time and agent busy time.

One potential problem that can occur results from the fact that idle time variance is usually related to idle time mean. That is, if conditions cause an increase in the idle time mean, then the idle time variance will increase as well. This produces an inflated estimated variance of agent utilization, which causes the distance scale to decrease. This can degrade the tracking ability of the estimated agent utilization rate, and so a modification to the algorithm is required.

The present invention modifies the algorithm by requiring that the standard deviation (square root of the variance) of idle time not exceed the value of the target idle item, computed from the busy time mean and the target utilization rate. This modification is based on the assumption that idle time behaves at worst like an exponential distribution. The target idle time mean is given by:

$$\mu_{y,targ} = \frac{\mu_{x,n+1}(1 - U_0/100)(P_{n+1})}{(1 - P_{n+1})}$$

The idle variance estimate is then adjusted by:

$$\sigma^2_{y,n+1} = MIN(\sigma^2_{y,n+1}, \mu^2_{y,targ})$$

where MIN assigns the lesser of its two arguments.

The remaining statistics, $S_n, T_n, \delta_{s,n}, \delta_{t,n}, A_n$, are functions of these values. The Call Pacing Delay parameter is then adjusted by $L_{n+1} = L_n + cA_{m+1}$, where c is a proportionality constant.

As in the case of drop rate control, care must be taken so that the control routine starts smoothly. Because of the greater complexity of controlling agent utilization statistics, a preferred embodiment of the present invention uses a different approach to control agent utilization than was used to control drop rate.

In the case of drop rate control, a start-up situation which leads to a large number of initial drops must be avoided so that the control routine is not forced to turn off predictive dialing to compensate. This is especially critical if the target drop rate is low. However, in the case of agent utilization control, the occurrence of initial drops or holds is not so critical, so the routine can be run without control for an initial period of time to allow the exponentially weighted estimates to accumulate, after which time control is initiated. All that is required for initialization is to set the initial values of the exponentially weighted parameters listed above equal to 0.

Furthermore, if the Call Pacing Delay starts with all agents logged on and awaiting calls, then the updating routine should not be called the first time each agent takes a call, since the corresponding initial idle time is artificial and not representative of the calling environment.

CONTROLLING HOLD TIME

In one embodiment of the present invention, an exponentially weighted estimate of mean hold time is used to control the Call Pacing Delay so that the mean hold time remains close to a target value. There are two types of mean hold time that can be defined, depending on whether or not the "zero" hold times are included. Throughout this section, the mean hold time refers to the overall mean including the "zero" hold times. The overall mean is related to the proportion of calls placed on hold and the non-zero mean hold time by $\mu = p * \mu^+$, where $\mu$ denotes the overall mean hold time; p denotes the proportion of calls placed on hold; and, $\mu^+$ denotes the non-zero mean hold time.

The problem with controlling the non-zero mean hold time is that if one call is placed on hold for a long time, the calling rate could be slowed so that no other calls are placed on hold. It would appear that the target rate would not be met in such a situation, even though only one call is placed on hold. The overall mean hold time is a more natural parameter to control, but the difference between these two means must be made clear. System users tend to think of only non-zero holds in the sequence, but this is not an appropriate measure for control use.

There are two basic approaches to the estimation of overall mean hold time. The simpler approach is to estimate the mean and variance of all hold times, without separating the "zero" hold times and the non-zero hold times. The other approach is to maintain separate estimates of the non-zero hold times and the proportion of calls placed on hold, and to estimate the variance appropriately. The second approach gives better estimates if the calling environment is static, but it may not give much improvement in a dynamic calling environment. For reasons of simplicity, the present invention implements an algorithm based on the first approach.

Let $X_k, k \geq 1$, be independent random variables representing the hold times with mean $\mu$ and variance $\delta^2$. Let $\delta$ denote the exponential weighing factor, and let $H_n, V_n$ denote the mean hold time and hold time variance estimates, respectively, after n observations. Then the hold time mean and hold time variance estimates are updated by:

$$N_{n+1} = \delta N_n + X_{n+1}, D_{n+1} = \delta D_n + 1, H_{n+1} = N_{n+1}/D_{n+1}, S_{n+1} = \delta S_n + (X_{n+1} - H_{n+1})^2, \text{ and } V_{n+1} = S_{n+1}/D_{n+1}$$

These estimates are used to obtain a distance between the estimated mean hold time and the target mean hold time, scaled by the standard deviation of hold time. One problem that can occur is that the hold time variance may increase as the mean increases, which can cause a decrease in the distance function. To overcome this potential problem, the standard deviation is bounded above by the target mean hold time which would equal the standard deviation of hold time if the mean hold time was at the target and the hold time distribution was an exponential distribution. This modification stabilizes the variance and increases the sensitivity of the distance function. The modified hold time variance is given by $$V_{n+1} = MIN(V_{n+1}, \mu_0^2)$$

where $\mu_0$ is the mean hold time target. The distance function is updated by $$A_{n+1} = \frac{H_{n+1} - \mu_0}{\sqrt{V_{n+1}}},$$

and the Call Pacing Delay is adjusted by $$L_{n+1} = L_n + cA_{n+1}$$

where $L_n$ is the current value of the Call Pacing Delay and c is a proportionally constant.

Initialization of the exponentially weighted registers $N_n$, $D_n$ and $S_n$ can be performed in a manner that is analogous to the initialization of the drop rate control routine. Let m denote an initial sample size. Then the initial values for $N_n$, $D_n$, $S_n$ are given by $$D_0 = \frac{1-\delta^m}{1-\delta}, N_0 = \mu_0 D_0, S_0 = \mu_0^2 D_0.$$

These values correspond to the values that would occur if the mean hold time is at the target value and the hold time distribution is, at worst, an exponential distribution.

Note that if a customer hangs up or the present invention drops a customer due to the unavailability of an agent, the time-on-hold for this customer is treated as the hold time. In a preferred embodiment of the present invention, a penalty is added for each such occurrence. Instead of sending the actual hold time to the statistical engine, some multiplier greater than 1 is used to increase the hold time.

Although the present invention and its advantages have been described in detail, it should be understood that various changes, substitutions and alterations can be made herein without departing from the spirit and scope of the invention as defined by the appended claims.

What is claimed is:

1. A call pacing system for initiating outbound telephone calls on a plurality of telephone lines coupled to an automated telephone system, said telephone calls to be handled by one or more telephone agents connected to said telephone system, said call pacing system comprising:

predictive dialing circuitry for initiating outbound calls from said telephone system according to a call pacing delay;

computer input means for receiving a target value for a first parameter selected from a plurality of operating parameters of said telephone system;

monitoring circuitry for measuring said plurality of operating parameters;

a control processor coupled to said computer input means and said monitoring circuitry for calculating and updating a plurality of averages of said operating parameters, and comparing a selected one of said averages corresponding to said first parameter to said target value in order to detect a difference between said selected average and said target value, said comparing occurring substantially concurrent with said measuring Said plurality of operating parameters; and adjustment means coupled to said predictive dialing circuitry and said control processor for increasing or decreasing said call pacing delay, wherein said adjustment means increases or decreases said call pacing delay so as to decrease the detected difference between said selected average and said target value.

2. The call pacing delay system as set forth in claim 1 wherein said first parameter is customer hold time, said customer hold time defined as a length of time said telephone system places a customer on hold whenever an outbound call is completed to said customer before one of said agents is available to handle said completed call.

3. The call pacing delay system as set forth in claim 2 wherein an average of customer hold time calculated by said control processor is an exponentially weighted average.

4. The call pacing delay system as set forth in claim 1 wherein said first parameter is drop rate, said drop rate defined as a rate at which completed outbound calls to customers on hold are dropped by said customers on hold or by said telephone system.

5. The call pacing delay system as set forth in claim 4 wherein an average of drop rate calculated by said control processor is an exponentially weighted average.

6. The call pacing delay system as set forth in claim 1 wherein said first parameter is agent utilization said agent utilization defined as a proportion of time during which said agents are actively handling calls.

7. The call pacing delay system as set forth in claim 6 wherein an average of agent utilization calculated by said control processor is an exponentially weighted average.

8. A method of controlling a predictive dialer placing outbound telephone calls on a plurality of telephone lines coupled to an automated telephone system, the telephone calls to be handled by a plurality of agents connected to the telephone system, the method comprising the steps of:

setting a target value for a first parameter selected from a plurality of operating parameters of the telephone system;

measuring the plurality of operating parameters of the telephone system;

calculating and updating a plurality of averages of the measured operating parameters;

comparing the target value with a corresponding one of the measured operating parameter averages in order to determine a difference, said comparing occurring substantially concurrent with said measuring said plurality of operating parameters; and adjusting a call pacing value in order to decrease the difference between the target value and the corresponding measured operating parameter average, wherein the call pacing value increases or decreases the rate at which the predictive dialer places outbound calls.

9. The method as set forth in claim 8 wherein the first parameter is a customer hold time, the customer hold time defined as a length of time the telephone system places a customer on hold whenever an outbound call is completed to the customer before one of the agents is available to handle the completed call.

10. The method as set forth in claim 9 wherein an average of customer hold time calculated in the step of calculating and updating is an exponentially weighted average.

11. The method as set forth in claim 8 wherein the first parameter is a drop rate, the drop rate defined as a rate at which completed outbound calls to customers on hold are dropped by the customers on hold or by the telephone system.

12. The method as set forth in claim 11 wherein an average of drop rate calculated in the step of calculating and updating is an exponentially weighted average.

13. The method as set forth in claim 8 wherein the first parameter is an agent utilization, the agent utilization defined as a proportion of time during which the agents are actively handling calls.

14. The method as set forth in claim 13 wherein an average of agent utilization calculated in the step of calculating and updating is an exponentially weighted average.

* * * * *